(12) United States Patent
Gupta et al.

(10) Patent No.: US 11,288,600 B2
(45) Date of Patent: *Mar. 29, 2022

(54) DETERMINING AN AMOUNT OF DATA OF A TRACK TO STAGE INTO CACHE USING A MACHINE LEARNING MODULE

(71) Applicant: INTERNATIONAL BUSINESS MACHINES CORPORATION, Armonk, NY (US)

(72) Inventors: Lokesh M. Gupta, Tucson, AZ (US); Kyler A. Anderson, Sahuarita, AZ (US); Matthew G. Borlick, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,696

(22) Filed: Apr. 12, 2021

(65) Prior Publication Data

US 2021/0232973 A1    Jul. 29, 2021

Related U.S. Application Data

(63) Continuation of application No. 16/052,049, filed on Aug. 1, 2018, now Pat. No. 11,062,232.

(51) Int. Cl.
*G06N 20/00* (2019.01)
*G06F 12/0802* (2016.01)

(52) U.S. Cl.
CPC ......... *G06N 20/00* (2019.01); *G06F 12/0802* (2013.01)

(58) Field of Classification Search
CPC ........ G06N 20/00; G06N 3/084; G06N 5/003; G06N 5/025; G06N 7/005; G06N 20/10;
(Continued)

(56) References Cited

U.S. PATENT DOCUMENTS 7,139,874 B1    11/2006  Milillo et al.
8,489,810 B2    7/2013   Panabaker et al.
(Continued)

OTHER PUBLICATIONS

List of IBM Patents or Patent Applications Treated as Related, filed Apr. 12, 2021, Total 2 pp.
(Continued)

*Primary Examiner* — Fernando Hidalgo
(74) *Attorney, Agent, or Firm* — Konrad Raynes Davda & Victor LLP; David W. Victor (57) ABSTRACT

Provided are a computer program product, system, and method for determining sectors of a track to stage into cache using a machine learning module. Performance attributes of system components affected by staging tracks from the storage to the cache are provided to a machine learning module. An output is received, from the machine learning module having processed the provided performance attributes, indicating a staging strategy indicating sectors of a track to stage into the cache comprising one of a plurality of staging strategies. Sectors of an accessed track that is not in the cache are staged into the cache according to the staging strategy indicated in the output.

20 Claims, 8 Drawing Sheets

(58) Field of Classification Search
CPC ............. G06F 12/0802; G06F 2201/81; G06F 3/0656; G06F 3/0689; G06F 11/3037; G06F 11/3409; G06F 11/3447; G06F 3/061; G06F 12/0862; G06F 12/123; G06F 2212/1021; G06F 2212/225; G06F 2212/262; G06F 2212/284; G06F 2212/286; G06F 2212/312; G06F 2212/462; G06F 2212/502; G06F 2212/6024; G06F 12/0868
USPC .......................................................... 706/12
See application file for complete search history.

(56) References Cited

U.S. PATENT DOCUMENTS

| | | | |
|---|---|---|---|
| 9,069,678 | B2 | 6/2015 | Benhase et al. |
| 9,251,215 | B2 | 2/2016 | Chen et al. |
| 9,609,050 | B2 | 3/2017 | Rash et al. |
| 9,619,748 | B1 | 4/2017 | Commons et al. |
| 10,248,337 | B2 * | 4/2019 | Frank .................... G06F 3/0608 |
| 10,599,429 | B2 * | 3/2020 | Anders ................. G06F 9/3016 |
| 10,783,089 | B2 * | 9/2020 | Chhabra ............. G06F 12/0835 |
| 10,817,217 | B2 * | 10/2020 | Williams ............. G06F 3/0659 |
| 2015/0339783 | A1 | 11/2015 | Mohanty et al. |
| 2016/0358068 | A1 | 12/2016 | Brothers et al. |
| 2016/0379115 | A1 | 12/2016 | Burger et al. |
| 2018/0060665 | A1 | 3/2018 | Song et al. |
| 2018/0060719 | A1 | 3/2018 | Kisilev et al. |
| 2018/0060731 | A1 | 3/2018 | Kadav et al. |
| 2019/0163664 | A1 * | 5/2019 | Karani .............. G06F 16/24578 |
| 2019/0340152 | A1 * | 11/2019 | Master ................ G06F 9/30181 |
| 2020/0042905 | A1 | 2/2020 | Gupta et al. |
| 2020/0042906 | A1 | 2/2020 | Gupta |
| 2020/0311604 | A1 * | 10/2020 | Gebre .................... G06N 20/00 |
| 2020/0311616 | A1 * | 10/2020 | Rajkumar .............. G06N 5/043 |

OTHER PUBLICATIONS

Liu et al.; "Optimizing ETL by a Two-Level Data Staging Method", International Journal of Data Warehousing and Mining, vol. 12, Issue No. 3 (2016) pp. 17.

Aksoy et al.; "Data Staging for On-Demand Broadcast", Proceedings of the 27th VLDB Conference, Roma, Italy, 2001, pp. 10.

Isaila et al.; "Design and Evaluation of Multiple Level Data Staging for Blue Gene Systems", IEEE Transactions on Parallel and Distributed Systems, vol. 22, Issue 6, (Jun. 2011) pp. 13.

Abbasi et al.; "DataStager: Scalable Data Staging Services for Petascale Applications", ACM 2009, p. 10.

U.S. Appl. No. 16/052,049, filed Aug. 1, 2018.

Office Action dated Nov. 30, 2020, pp. 14, for U.S. Appl. No. 16/052,049.

Response dated Feb. 28, 2021, pp. 11, to Office Action dated Nov. 30, 2020, pp. 14, for U.S. Appl. No. 16/052,049.

Notice of Allowance dated Mar. 10, 2021, pp. 9, for U.S. Appl. No. 16/052,049.

U.S. Appl. No. 16/051,984, filed Aug. 1, 2018.

Office Action 1 dated Dec. 14, 2020, pp. 19, for U.S. Appl. No. 16/051,984.

Response to Office Action1, dated Mar. 10, 2021, pp. 11, for U.S. Appl. No. 16/051,984.

Notice of Allowance dated Mar. 26, 2021, pp. 17.

List of IBM Patents or Patent Applications Treated as Related, May 14, 2021, Total 2 pp.

U.S. Patent Application, dated May 13, 2021, for U.S. Appl. No. 17/320,218, filed May 13, 2021, Total 43 pgs.

Preliminary Amendment, dated May 13, 2021, for U.S. Appl. No. 17/320,218, filed May 13, 2021, Total 8 pgs.

* cited by examiner

Performance Information

FIG. 5

Staging Strategy Adjustment Rule

DETERMINING AN AMOUNT OF DATA OF A TRACK TO STAGE INTO CACHE USING A MACHINE LEARNING MODULE

BACKGROUND OF THE INVENTION

1. Field of the Invention

The present invention relates to a computer program product, system, and method for determining sectors of a track to stage into cache using a machine learning module.

2. Description of the Related Art

A storage controller may utilize an adaptive caching control block (ACCB) algorithm to manage the staging of sectors of a track into cache when staging the track into cache. An ACCB algorithm uses different staging strategies, such as a sector strategy to only stage the requested sectors when staging a track into cache, a partial track staging to only stage from a first accessed sector to an end sector in the track, and full track staging to stage all the sectors in the track. To determine which staging strategy to use to stage a track into cache, the ACCB algorithm maintains information on cache misses indicating a number of requests to access a track that is not in the cache, cache hits indicating a number of requests to access a track that is in the cache, front accesses indicating a number of requests where the first requested sector of a track precedes the sectors for the track in the cache, and back accesses indicating a number of requests where the first requested sector of the track follows the sectors for the track in the cache.

Based on this performance information, the ACCB algorithm calculates a historical front end access ratio (HFEAR) comprising a ratio of front access misses, i.e., requests to sectors of a track that precede the sectors in the cache 210 for the cache, and may be calculated as ((front accesses divided by (cache hits plus cache misses) plus a previously calculated historical front end access ratio) divided by two. The ACCB algorithm further calculates a historical alternate record access ratio (HARAR) indicating how much front accesses and back accesses are a total percentage of total accesses, and may be calculated as ((front accesses plus back accesses) divided by (cache hits plus cache misses) plus a previously calculated historical alternate record access ratio) divided by two. If the HFEAR is high, then the ACCB algorithm will use a full track staging to stage all sectors of the track into cache to avoid front accesses because most sector misses are to sectors preceding sectors of the track in the cache. If both the HARAR is high and the HFEAR is low, then most misses are back accesses, i.e., where the first requested sector follows the sectors of the track. In such case, the ACCB algorithm will use a partial track staging of sectors from a first requested sector to the end of the track to reduce cache misses.

There is a need in the art for improved techniques to determine a staging strategy to use to determine which sectors to stage when staging a track into the cache.

SUMMARY

Provided are a computer program product, system, and method for determining sectors of a track to stage into cache using a machine learning module. Performance attributes of system components affected by staging tracks from the storage to the cache are provided to a machine learning module. An output is received, from the machine learning module having processed the provided performance attributes, indicating a staging strategy indicating sectors of a track to stage into the cache comprising one of a plurality of staging strategies. Sectors of an accessed track that is not in the cache are staged into the cache according to the staging strategy indicated in the output.

With the above embodiment, the machine learning module is trained to produce a staging strategy that optimizes computer performance attributes. This allows for continual and dynamic adjustment of the staging strategy as system performance attributes and operational parameters change, such as response time, adaptor bandwidth, storage speed, etc. In this way, the staging strategy the machine learning module is trained to produce for different performance attributes is continually adjusted to optimize performance attributes such as cache hits, adaptor bandwidth, response time, etc.

In a further embodiment, the plurality of staging strategies include at least a plurality of a partial track staging to stage all sectors from a requested sector of a track, a sector staging to stage only the requested sectors of the track, and a full track staging to stage all sectors of the track.

With the above embodiment, the staging strategy concerns how many sectors of a track to stage into cache when brining a track into cache to provide a sufficient number to anticipate future access and avoid over per-staging sectors not needed that would unnecessarily consume network bandwidth.

In a further embodiment, the performance attributes provided to the machine learning module comprise a plurality of: cache misses indicating a number of requests to access a track that is not in the cache; cache hits indicating a number of requests to access a track that is in the cache; front accesses incremented in response to a request to a track indicated as in the cache and the request having a first requested sector of at least one sector requested that precedes a first staged sector of the track; back accesses incremented in response to a request to a track indicated as in the cache and the request having a first requested sector of at least one sector requested that follows a last staged sector of the track; speed of the storage including a specified speed of at least one storage device in which the storage is implemented, a response time to respond to requests for sectors; a current adaptor bandwidth through which data is transferred between the cache and the storage; and optimum adaptor bandwidth indicating for transferring data between the cache and the storage.

With the above embodiment, performance attributes that have the greatest impact on an appropriate caching strategy are used by the machine learning module to determine the optimal staging strategy. For instance, performance attributes such as a high number of cache misses, front accesses, and back accesses, higher speed of storage, faster response time, higher difference of optimal adaptor bandwidth and current adaptor bandwidth indicate that a staging strategy staging in a greater number of tracks should be considered. On the other hand, performance attributes such as a lower number of cache misses, front accesses, and back accesses, slower speed of storage, slower response time, small difference of optimal adaptor bandwidth and current adaptor bandwidth indicate that a staging strategy staging in a fewer number of tracks should be considered.

In a further embodiment, the performance attributes further include: historical front end access ratio comprising ((front accesses divided by (cache hits plus cache misses) plus a previously calculated historical front end access ratio) divided by two; and historical alternate record access ratio comprising ((front accesses plus back accesses) divided by (cache hits plus cache misses) plus a previously calculated historical alternate record access ratio) divided by two.

The above embodiment provides the machine learning module performance attributes having significant impact on a sector staging strategy, where if the historical front end access ratio (HFEAR) is high and the historical alternate record access ratio (HARAR) is low, then most misses are back accesses, i.e., where the first requested sector follows the sectors of the track in the caches, which indicates that partial track staging of sectors from a first requested sector to the end of the track may reduce cache misses.

In a further embodiment, the storage comprises a Redundant Array of Independent Disk (RAID) rank of a plurality of RAID ranks. Each of the RAID ranks is comprised of storage devices, wherein the speed of the storage and the response time are provided for one RAID rank of the RAID ranks, and wherein a staging strategy is provided for each of the RAID ranks.

In a further embodiment, a request to access a requested track is received and a determination is made as to whether the requested track is in the cache. The performance attributes are provided to the machine learning module in response to determining the track is not in the cache, wherein the output staging strategy from the machine learning module is used to determine at least one sector to stage into the track that is not in the cache.

With the above embodiment, the machine learning module is used to select an optimal staging strategy to use when the track is not in the cache, which indicates that current caching and staging strategies are deficient as a result of the requested track not being in the cache.

In a further embodiment, the performance attributes include cache misses indicating a number of requests to access a track that is not in the cache, cache hits indicating a number of requests to access a track that is in the cache, front accesses incremented in response to a request to a track indicated as in the cache and the request having a first requested sector of at least one sector requested that precedes a first staged sector of the track, and back accesses incremented in response to a request to a track indicated as in the cache and the request having a first requested sector of at least one sector requested that follows a last staged sector of the track. The cache hits are incremented in response to determining that the requested track is in the cache and the cache misses are incremented in response to determining that the requested track is not in the cache. A determination is made as to whether a first of requested sectors in the requested track are in the cache in response to determining that the requested track is in the cache. The back accesses are incremented in response to determining that the first of the requested sectors follow sectors of the track in the cache. The front accesses are incremented in response to determining that the first of the requested sectors precedes sectors of the track in the cache.

With the above embodiment, the performance attributes are updated in real time based on results for track and sector accesses in the cache to provide immediate information to the machine learning module to use to determine the optimal staging strategy.

DETAILED DESCRIPTION

An adaptive caching algorithm, such as an ACCB, can improve the cache hit ratio for sectors for a track in the cache by implementing a staging strategy, such as partial track or full track staging, to stage more sectors into cache. However, current adaptive prestaging algorithms do not take into account system performance parameters and the effect of increasing the amount of sectors staged into cache on performance. For instance, if resources are over utilized, such as the adaptor bandwidth, and the response time is slow, then increasing the number of sectors staged may further increase the burden on system resources to transfer sectors from storage to the cache through a device adaptor. Further, for higher bandwidth storage devices, bandwidth may be more scarce than drive operations.

Described embodiments provide improvements to the computer technology for determining a staging strategy to stage sectors of a track into the cache by providing performance attributes of system components affected by staging tracks from the storage to the cache to a machine learning module. The machine learning module processes the provided performance attributes and outputs a staging strategy indicating sectors of a track to stage into the cache comprising one of a plurality of staging strategies used to determine the sectors of a track to stage into cache when staging the track into the cache. The machine learning module is trained to produce a staging strategy that optimizes computer performance attributes such as adaptor bandwidth, cache hits, cache misses, front accesses, back accesses, and response time. The machine learning module trained for such optimization may then be used to determine the optimal staging strategy based on current performance attributes. This allows for continual and dynamic adjustment of the staging strategy as system performance attributes and operational parameters change, such as response time, adaptor bandwidth, storage speed, etc. In this way, the staging strategy the machine learning module is trained to produce for different performance attributes is continually adjusted to optimize performance attributes such as cache hits, adaptor bandwidth, response time, etc.

Figure 1:
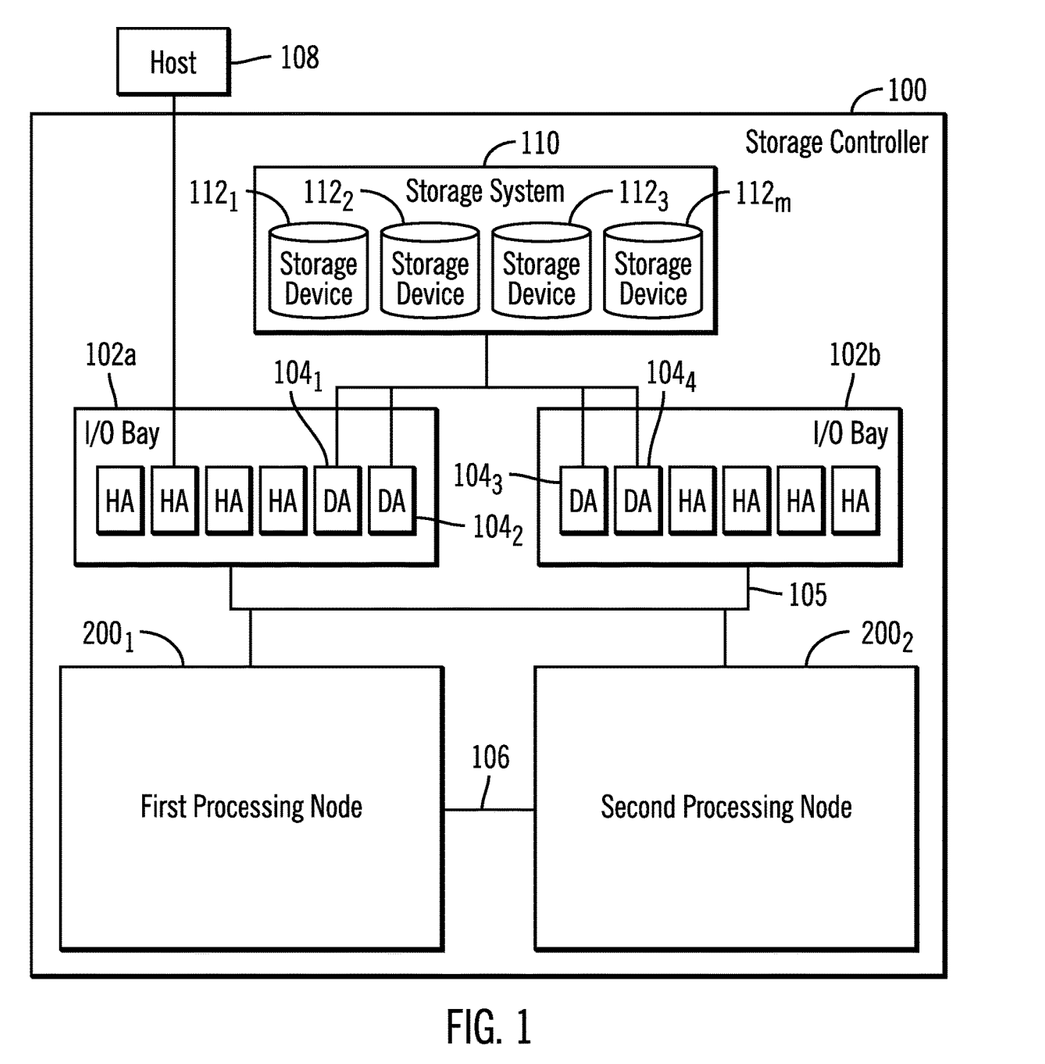
FIG. 1 illustrates an embodiment of a computing environment.

FIG. 1 illustrates an embodiment of a storage controller 100 including a plurality of independent processing nodes $200_1$, $200_2$, such as a central electronics complex (CEC), that each connect to Input/Output (I/O) bays 102a, 102b having device adaptors (DA) $104_1$, $104_2$, $104_3$, $104_4$, also referred to as storage adaptors, and host adaptors (HA) therein, over a bus interface 105, such as a Peripheral Component Interconnect Express (PCIe) bus. The processing nodes $200_1$, $200_2$ may also communicate with each other directly over a link 106, such as a PCIe bus. Host systems, such as host 108, may connect to the storage controller 100 through a host adaptor (HA) in the I/O bays 102a, 102b.

A storage system 110 includes a plurality of storage devices $112_1 \ldots 112_m$, in which tracks, logical volumes, ranks of logical contiguous storage spaces, and storage arrays, such as Redundant Arrays of Independent Disks (RAID), may be configured. Each processing node $200_1$, $200_2$ may be assigned one of the device adaptors in each of the I/O bays 102a, 102b that connect to the storage array 110 to provide access to data configured in the storage devices 112. Each processing node $200_1$, $200_2$ has a default configuration to communicate with a device adaptor (DA) $104_1$, $104_2$, $104_3$, $104_4$ in one of the I/O bays 102a, 102b, where the default configuration will assign the different processing nodes $200_1$, $200_2$ to device adaptors in the I/O bays 102a, 102b.

In the embodiment of FIG. 1, two redundant processing nodes $200_1$, $200_2$ and two I/O bays 102a, 102b are shown. In further embodiments, there may be more than the number of shown redundant elements $200_1$, $200_2$, 102a, 102b, to provide additional redundancy. Alternatively, there may be only one processing node in the system.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1, \ldots 112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1, \ldots 112_m$, such as Just a Bunch of Disks (JBOD), Direct Access Storage Device (DASD), Redundant Array of Independent Disks (RAID) array, virtualization device, etc. Further, the storage devices $112_1 \ldots 112_m$ in the storage 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
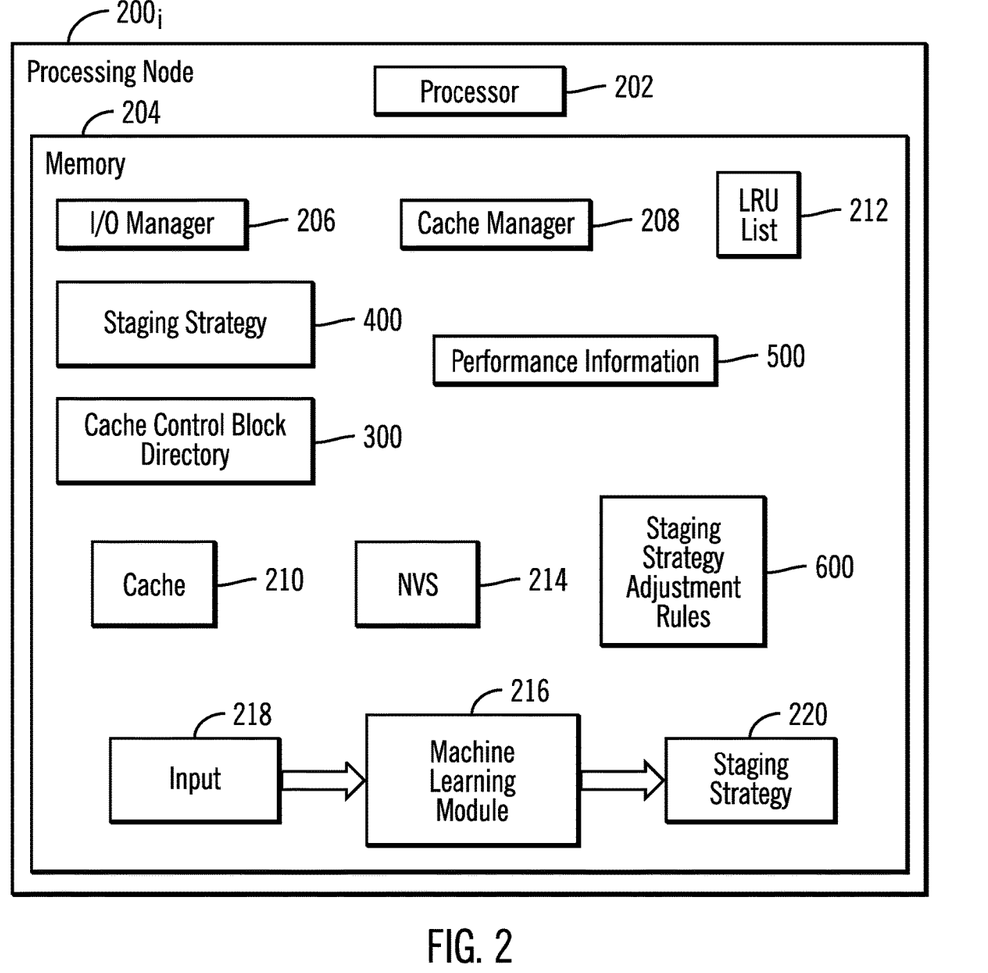
FIG. 2 illustrates an embodiment of a processing node.

FIG. 2 illustrates an embodiment of a processing node $200_i$, such as one of the processing nodes $200_1$, $200_2$, including a processor 202, such as one or more processor devices, and a memory 204 having program code executed by the processor 202. The memory 204 includes an I/O manager 206 and cache manager 208. The I/O manager 206 manages access requests from internal processes in the computing system 100 and/or from hosts 108 for tracks in the storage 110. The cache manager 208 maintains modified tracks in a cache 210. A track may comprise any unit of data configured in the storage 110, such as a track, Logical Block Address (LBA), etc., which is part of a larger grouping of tracks, such as a volume, logical device, etc. Each processing node $200_1$, $200_2$ may be assigned groups of the storage arrays configured in the storage devices $112_1 \ldots 112_m$.

The cache manager 208 maintains a cache control block directory 300 and a Least Recently Used (LRU) list 212 for tracks in the cache 210. The control block directory 300 includes the cache control blocks, where there is one cache control block for each track in the cache 210 providing metadata on the track in the cache 210. Upon determining that the LRU list 212 is full or has reached a threshold level, the cache LRU list 212 is used to determine tracks to evict from the cache 210. When a track is modified in the cache 210 in node $200_i$, a copy of the modified track may be copied to a non-volatile storage device ("NVS") 214 in the other node $200_j$ to maintain a backup copy of the track on another node for redundancy.

The memory 204 includes a staging strategy 400 indicating sectors of a track to stage into the cache when staging a track into the cache 210 in response to a request to access a track not in the cache. The staging strategies 400 may include a partial track staging to stage all sectors from a requested sector of the track to the end sector of the track, sector staging to stage only the requested sectors of the track, and a full track staging to stage all sectors of the track. Other staging strategies indicating different subsets of the sectors of a track to stage may also be indicated. The memory 204 further includes performance information 500 having various performance attributes related to performance of components affected by staging tracks from the storage 110 into the cache 210, such as the device adaptors $104_i$ through which data is transferred from the storage 110 to the cache 210. The memory 204 further includes staging strategy adjustment rules 600 used to determine how to adjust the staging strategy 400 being used based on performance attributes 500.

In embodiments where the host 108 operating system comprises Z Systems Operating System (Z/OS®), or other similar operating system, an I/O request may define the stage group of tracks subject to operations, such as sequential access operations, by providing a locate record domain that specifies the subset of tracks subject to the I/O operations, and the trigger track would be the track at the track number in the locate record domain matching the trigger track number.

The memory 204 includes a machine learning module 216 that receives as input 218 performance information 500 and computes a staging strategy 220 indicating a number of sectors to stage into cache 210 in response to an access request to a sector of a track not currently in the cache 210, i.e., a track for which there is no cache control block $300_i$ in the cache control block directory 300. The machine learning module 216 implements a machine learning technique such as decision tree learning, association rule learning, artificial neural network, inductive programming logic, support vector machines, Bayesian models, etc. The cache manager 208 uses the outputted staging strategy 220 to determine a number of sectors of a track to stage into cache 210 when staging the track into the cache 210. The arrows shown from the input 218 to the machine learning module 216 and to the output 220 illustrate a flow of data to and from the machine learning module 216 and not actual structures in the memory 204.

In one embodiment, the machine learning module 216 may comprise artificial neural network programs. Each neural network may be trained using backward propagation to adjust weights and biases at nodes in a hidden layer to produce the computed trigger track and prestage amount. The machine learning module 216 is trained to produce a staging strategy 220 to optimize and balance performance goals, such as minimize cache misses, minimize front accesses and back accesses, and optimize performance attributes such as response time and adaptor bandwidth in the device adaptors $104_1$, $104_2$, $104_3$, $104_4$ transferring data between the cache 210 and the storage 110. In backward propagation used to train a neural network machine learning module, margin of errors are determined based on operational parameters, based on a value of a performance attribute, such as a response time and adaptor bandwidth, and a threshold of the performance attribute, such as a maximum acceptable response time and optimum adaptor bandwidth, and biases at nodes in the hidden layer are adjusted accordingly to decrease the margins of error in these measured storage parameters. Backward propagation may comprise an algorithm for supervised learning of artificial neural networks using gradient descent. Given an artificial neural network and an error function, the method may calculate the gradient of the error function with respect to the neural network's weights and biases.

Although FIG. 2 shows one machine learning module 216, there may be separate machine learning module 216 for each RAID rank, or other storage unit, configured in the storage 110 or one machine learning module for all the ranks, or one or more storage units configured in the storage 110.

The I/O manager 206, cache manager 208, and machine learning module 216 are shown in FIG. 2 as program code loaded into the memory 204 and executed by the processor 202. Alternatively, some or all of the functions may be implemented in hardware devices in the processing nodes $200_1$, $200_2$, such as in Application Specific Integrated Circuits (ASICs) or executed by separate dedicated processors.

The memory 204 and cache 210 may comprise one or more memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 214 may comprise a non-volatile storage, such as NAND storage, e.g., flash memory, Solid State Drive (SSD) storage, non-volatile RAM, etc. Other non-volatile devices may be used for the non-volatile storage 214, such as a battery backed-up DIMM. The NVS 214 may be located in a separate physical memory or storage device than other parts of the memory 204, such as the cache 210.

Figure 3:
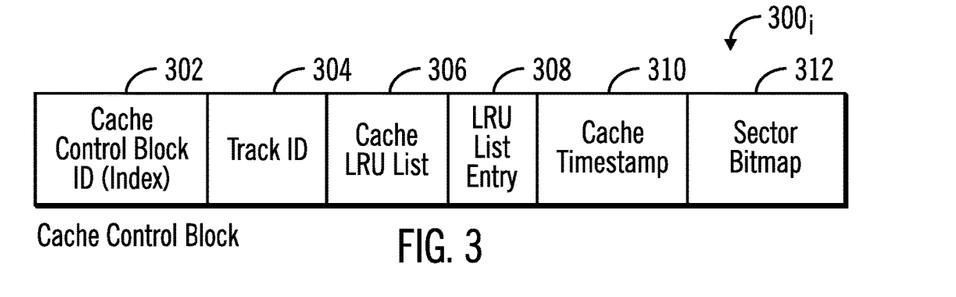
FIG. 3 illustrates an embodiment of a cache control block

FIG. 3 illustrates an embodiment of a cache control block $300_i$ for one of the tracks in the cache 210, including, but not limited to, a cache control block identifier 302, such as an index value of the cache control block $300_i$; a track ID 304 of the track in the storage 110 having sectors staged into the cache 210; the cache LRU list 306 in which the cache control block $300_i$ is indicated; an LRU list entry 308 at which the track is indicated; a cache timestamp 310 indicating a time the track was added to the cache 210 and indicated on the LRU list 306; and a sector bitmap 312 indicating sectors of the track 304 that are in the cache 210.

Figure 4:
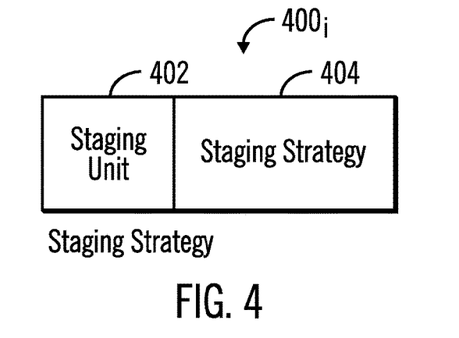
FIG. 4 illustrates an embodiment of a staging strategy.

FIG. 4 illustrates an embodiment of a staging strategy instance $400_i$ that provides for a staging unit 402 a staging strategy 404 to use to stage sectors of a track into cache 210, such as full track staging, partial track staging, and sector staging. A staging unit 402 may comprise a storage unit or division to which the staging strategy 404 applies, such as a RAID rank or a cylinder band in storage architectures where the storage 110 is addressed as bands of cylinders, where each cylinder in a cylinder band has a plurality of tracks, and where each track has a plurality of sectors. Thus, different staging units may have different staging strategies 404— produced by the machine learning module 216.

Figure 5:
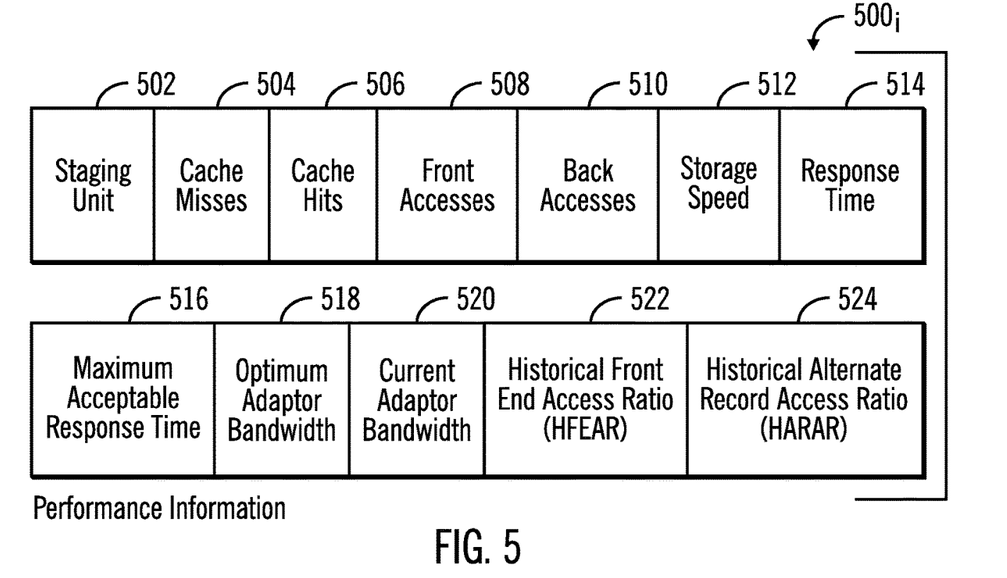
FIG. 5 illustrates an embodiment of performance information.

FIG. 5 illustrates an embodiment of performance information instance 500, for a staging unit, such as RANK, band of cylinders, etc., and includes the staging unit identifier (ID) 502; a number of cache misses 504 indicating a number of requests to access a track in the staging unit 502 that is not in the cache 210; cache hits 506 indicating a number of requests to access a track in the staging unit 502 that is in the cache 210; front accesses 508 incremented in response to a request to a track indicated as in the cache 210 when the request is to a first requested sector that precedes a first sector of the track in the cache 210; back accesses 510 incremented in response to a request to a track indicated as in the cache 210 when the request is to a first requested sector that follows a last sector of the track in the cache 210; a storage speed 512 of the storage device $112_i$ in which the staging unit 502 is implemented; a response time 514 to respond to requests for sectors in the staging unit 502; a maximum acceptable response time 516 comprising a threshold acceptable response time for accessing sectors of a track; an optimum adaptor bandwidth 518 for transferring data between the cache 210 and the storage 110 through the device adaptor $104_i$ used for the staging unit 402; and a current adaptor bandwidth 520 for a device adaptor $104_i$ through which data is transferred between the cache 210 and the storage 110.

The performance information $500_i$ may also include calculated values such as a historical front end access ratio (HFEAR) 522 and a historical alternate record access ratio (HARAR) 524. The HFEAR 522 may comprise a ratio of front access misses, i.e., requests to sectors of a track that precede the sectors in the cache 210 for the track, and may be calculated as ((front accesses divided by (cache hits plus cache misses) plus a previously calculated historical front end access ratio) divided by two. The HARAR 524 indicates how much front accesses and back accesses are a total percentage of total accesses, and may be calculated as ((front accesses plus back accesses) divided by (cache hits plus cache misses) plus a previously calculated historical alternate record access ratio) divided by two. If the HARAR 524 is high and the HFEAR 522 is low, then most misses are back accesses, i.e., where the first requested sector follows the sectors of the track in the cache 210, which indicates that partial track staging of sectors from a first requested sector to the end of the track may reduce cache misses.

Figure 6:
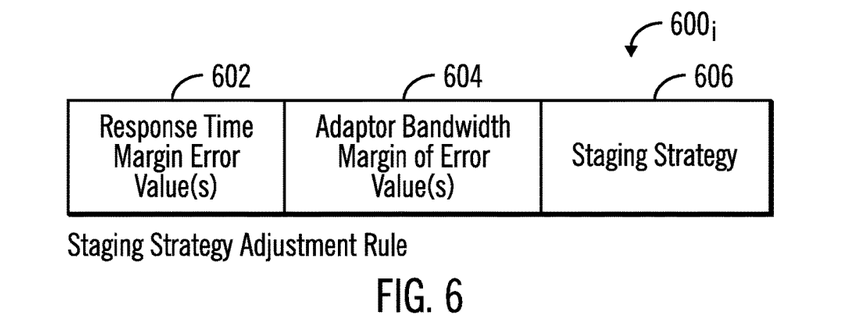
FIG. 6 illustrates an embodiment of a staging strategy adjustment rule.

FIG. 6 illustrates an embodiment of a staging strategy adjustment rule instance $600_i$ indicating an adjustment to the staging strategy based on certain performance attribute margin of errors. A staging strategy adjustment rule $600_i$ may specify one or more performance margin of errors, such as a response time margin of error 602 and an adaptor bandwidth margin of error 604, and a staging strategy 606 to use for the specified margin of errors 602, 604. For instance, the response time margin of error 602 may comprise a (maximum acceptable response time 516 minus a current response time 514) divided by the maximum acceptable response time 516. The adaptor bandwidth margin of error 604 may comprise an (optimum adaptor bandwidth 518 minus a current adaptor bandwidth 520) divided by the optimum adaptor bandwidth 518. In further embodiments, other performance attribute margins of error may be used, such as calculated by a (threshold for a performance attribute minus a current value for the performance attribute) divided by the threshold.

Figure 7:
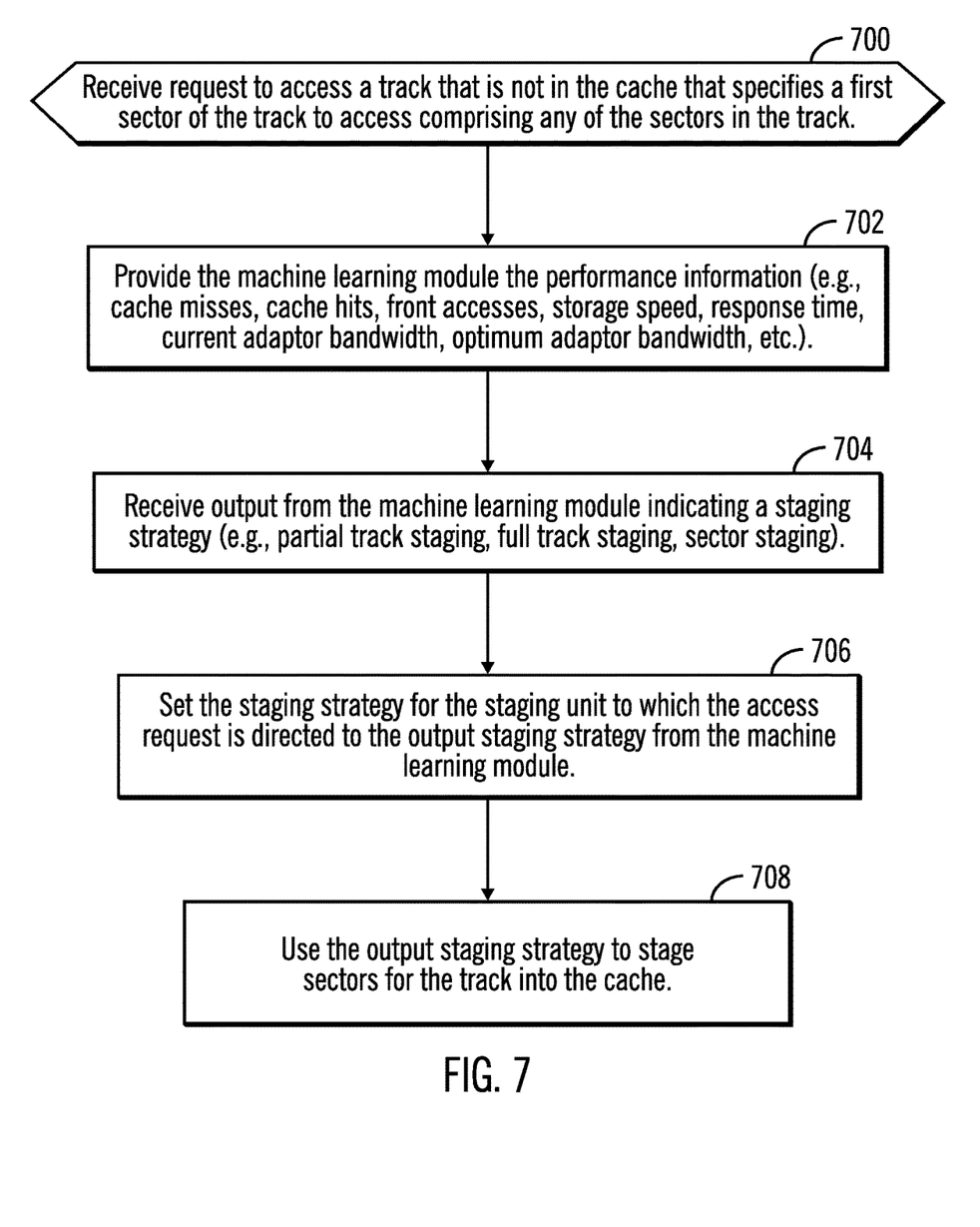
FIG. 7 illustrates an embodiment of operations to use a machine learning module to determine a staging strategy.

FIG. 7 illustrates an embodiment of operations performed by the cache manager 208 to process a request to a track that is not in the cache 210 that specifies a first sector of the track to access that may comprise any sector or range of sectors in the track. The operations of FIG. 7 may also be performed after a predetermined number of track accesses to adjust the staging strategy after a number of cache misses 504. Upon receiving (at block 700) the request to the track not in the cache 210, the cache manager 208 provides (at block 702) the machine learning module 216 as input 218 performance information 500 (e.g., 504-524). In response to the input 218, the cache manager 208 receives (at block 704) from the machine learning module 216 output comprising a new staging strategy 220 (e.g., partial track staging, full track staging, sector staging). The staging strategy 404 for the staging unit 402 in staging strategy $400_i$ is updated with the output staging strategy 220 from the machine learning module 216. This new staging strategy 404 may then be used to stage sectors when staging the track in the staging unit 402 into the cache 210.

With the embodiment of FIG. 7, the staging strategy 220 is continually updated when staging a track into cache 210 to determine an optimized staging strategy based on current performance attributes to improve computer operations, such as improve adaptor bandwidth, response time, etc. This allows continual modification of the staging strategy to optimize computer performance.

Figure 8:
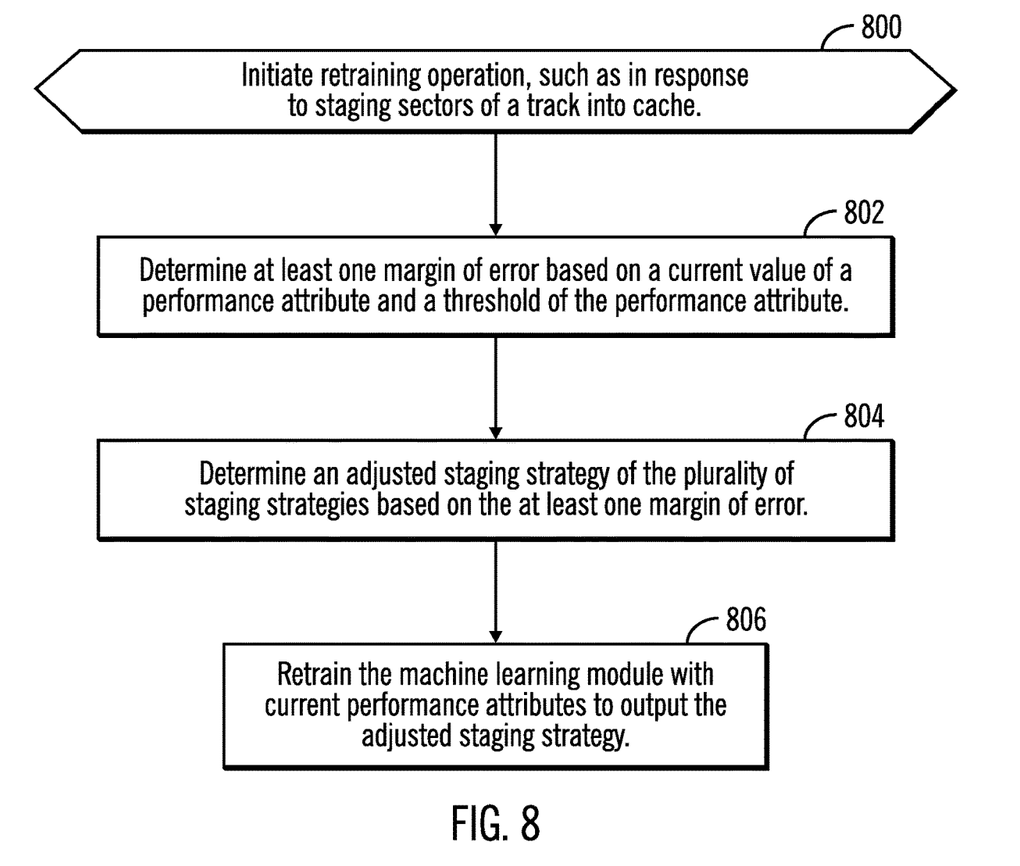
FIG. 8 illustrates an embodiment of operations to retrain the machine learning module.

FIG. 8 illustrates an embodiment of operations performed by the cache manager 208 and/or machine learning module 216 to retrain the machine learning module 216 to improve how it calculates the staging strategy 220 to optimize computer performance when staging tracks into the cache 210. The operations of FIG. 8 may be performed after completing the staging of sectors of a track into the cache 210. Upon initiating (at block 800) a retraining of the machine learning module 216, the machine learning module 216 (and/or cache manager 208) determines (at block 802) at least one margin of error based on a current value of a performance attribute, e.g., response time 514, adaptor bandwidth 520, and a threshold of a performance attribute, e.g., maximum acceptable response time 516, and optimum adaptor bandwidth 518. An adjusted staging strategy is determined (at block 804) based on the at least one margin of error, such as by using the staging strategy adjusting rules 600, that provide different staging strategies 606 for different values of the considered at least one margin of error, e.g., 602 and 604. The machine learning module is retrained (at block 806) with the current performance attributes 500 to output the adjusted staging strategy.

With the embodiment of FIG. 8, the machine learning module 216 is retrained to produce an adjusted staging strategy that is adjusted to optimize performance based on the extent of one or more performance margins of error. For instance, if the margins of error are low, indicating that the performance attribute, such as response time 514 adaptor bandwidth 520, is not exceeding predetermined performance thresholds 516 and 518, then the staging strategy can be adjusted to stage in more sectors to reduce the likelihood of cache misses without negatively impacting performance because the performance margins of error are low. However, if the performance margins of error are high, indicating that the performance attributes are exceeding thresholds indicating system components are being over utilized and experiencing latency, then a staging strategy that stages fewer sectors may be more optimal to reduce staging burdens on the system resources, such as adaptor bandwidth and storage device bandwidth. In this way, the machine learning module 216 is retrained to select a staging strategy to balance the goal of reducing front access 508 and back access 510 sector misses by increasing the number of sectors staged into cache 210 with the track and also avoid over utilization of system resources that can increase latency and further reduce system performance.

Figure 9:
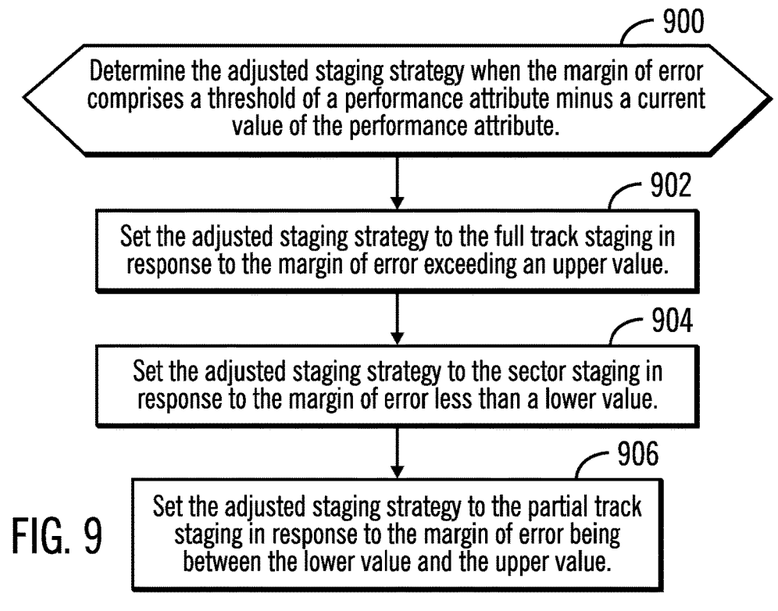
FIGS. 9 and 10 illustrate embodiments of operations to determine an adjusted staging strategy to use to retrain the machine learning module.

FIG. 9 illustrates an embodiment of operations performed by the cache manager 208 and/or machine learning module 216 to adjust the staging strategy used to retrain the machine learning module 216 based on current performance margins of error. Upon initiating (at block 900) an operation to determine an adjusted staging strategy when the margin of error comprises a threshold of a performance attribute minus a current value of the performance attribute, the machine learning module 216 sets (at block 902) the adjusted staging strategy to the full track staging if the margin of error, such as a response time margin of error and/or adaptor bandwidth margin of error, exceeds an upper value, which means performance is at a sufficiently low enough level, i.e., components are underutilized, so that all the sectors can be staged into the cache 210. The cache manager 208 sets (at block 904) the adjusted staging strategy to the sector staging, only requested sectors, if the margin of error is less than a lower value, which means performance is at a sufficiently high level, i.e., components are over utilized, so that only the minimum number of sectors are staged into the cache 210, to minimize further burdens on system resources. The cache manager 208 sets (at block 906) the adjusted staging strategy to the partial staging if the margin of error is between the lower and upper values, which means performance is moderate, so that an intermediate number of sectors are staged into the cache, partial track staging, so that a number of sectors are staged into the cache 210 to provided increased staging but not to the highest level so as to burden system components and performance.

Figure 10:
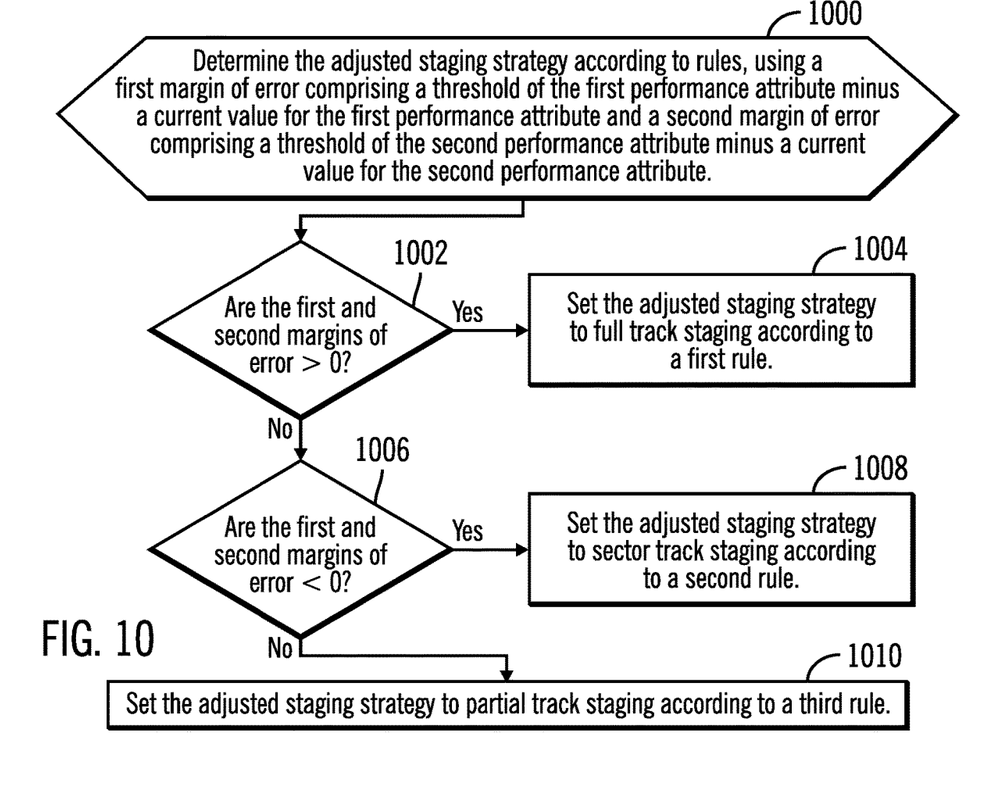

FIG. 10 illustrates an alternative embodiment of operations performed by the cache manager 208 and/or machine learning module 216 to adjust the staging strategy used to retrain the machine learning module 216 based on current performance margins of error staging strategy adjustment rules 600. Upon initiating (at block 1000) an operation to determine an adjusted staging strategy, such as at block 804 in FIG. 8, the machine learning module 216 determines (at block 1002) whether both performance margins, e.g., response time and device adaptor bandwidth, are greater than zero or some other predetermined value, indicating low utilization of resources. If so, then the adjusted staging strategy 404 is set (at block 1004) to full track staging according to a first rule $400_1$. If (at block 1006) both margins are less than zero or a predetermined value, indicating high resource utilization, then the adjusted staging strategy is set (at block 1008) to sector track staging according to a second rule $400_2$. Otherwise, if (from the no branch of block 1006) only one of the first and second margins are less than zero (or the predetermined value) and another higher one margin is not greater than zero (or the predetermined value), then the adjusted staging strategy is set (at block 1010) to partial track staging according to a third rule $400_3$.

FIGS. 9 and 10 provide different embodiments for determining the adjusted staging strategy based on performance attribute margins of error that indicate whether performance is low or high and system resource utilization is high or low, respectively, to stage in a greater amount of sectors depending on resource utilization to optimize staging strategy across different current performance attributes and provide an optimal adjusted staging strategy to use to retrain the machine learning module 216.

Figure 11:
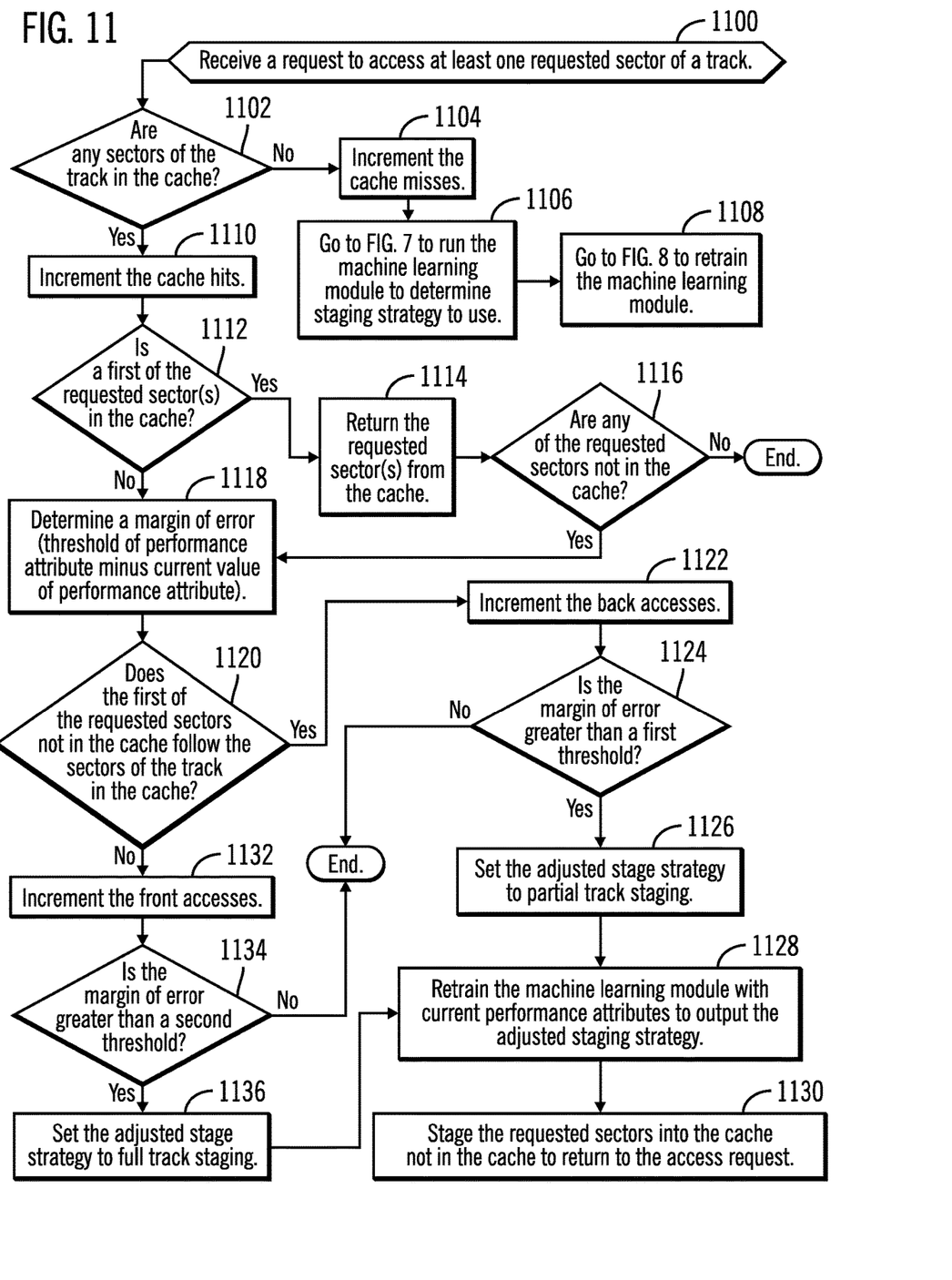
FIG. 11 illustrates an embodiment of operations to process a request to access at least one sector in a track.

FIG. 11 illustrates an embodiment of operations performed by the cache manager 208 to process an access request to a sector in a track, utilizing the operations of FIGS. 7-10. Upon receiving (at block 1100) a request to access at least one sector of a track, if (at block 1102) there are no sectors of the track in the cache 210, which may be determined if there is no cache control block $300_i$ for the track in the cache control block directory 300, then the cache misses 504 are incremented (at block 1104) and the machine learning module 216 is invoked (at block 1106) to perform the operations of FIG. 7 to determine the staging strategy to use. After staging sectors of the track into the cache 210, control proceeds (at block 1108) to FIG. 8 to retrain the machine learning module 216 based on current performance margins of error.

If (at block 1102) there are sectors for the requested track in the cache 210, then the cache hits 506 are incremented (at block 1110). If (at block 1112) a first of the requested one or more sectors is in the cache 210, then the cache manager 208 returns (at block 1114) the requested sectors. If (at block 1116) some but not all of the requested sectors are in the cache 210 or if (at block 1112) the first requested sector is not in the cache 210, then the cache manager 208 and/or the machine learning module 216 determines (at block 1118) a margin of error ((threshold of performance attribute minus current value of performance attribute) divided by the threshold), such as a response time margin of error and/or adaptor bandwidth margin of error. If (at block 1116) all of the requested sectors are in the cache 210, then control ends. If (at block 1120) the first of the requested sectors not in the cache 210 follows the sectors of the track in the cache 210, i.e., a back access miss, then the back accesses 510 are incremented (at block 1122). If (at block 1124) the margin of error is greater than a first threshold, i.e., system resources are not over utilized, then the adjusted staging strategy is set (at block 1126) to partial track staging and the machine learning module 216 is retrained (at block 1128) with the current performance attributes 500 to output the adjusted staging strategy as in FIG. 8. The requested sectors from the first requested sector not in the cache to the end sector of the track are then staged (at block 1130) into the cache 210 from the storage 110 to return to the access request.

If (at block 1120) the first of the requested sectors not in the cache 210 precedes the sectors in the cache, then the front accesses 508 are incremented (at block 1132). If (at block 1134) the margin of error is greater than a second threshold, which may be higher than the first threshold, thus requiring less system utilization than at block 1124, then the adjusted staging strategy is set (at block 1136) to full track staging, which requires greater use of system resources than partial track staging. Control then proceeds to block 1128 to retrain the machine learning module for full track staging. If (at block 1124 or 1134) the margin of error is not greater than either of the thresholds, indicating that system utilization is too high to allow for staging of more tracks, which requires greater use of system resources, then control ends without retraining the machine learning module 216 to stage in more tracks given the current performance information 500 that resulted in the situation of additional sectors not being staged.

With the embodiment of FIG. 11, the machine learning module 216 is used to select an optimal staging strategy to use when the track is not in the cache to determine sectors to stage when bringing the track into the cache 210. Bringing a track into cache 210 that currently is not in the cache 210 would further create a cache control block $300_i$ for the added track. If some of the requested sectors are not in the cache 210, then a determination is made whether a performance margin of error satisfies a condition, which indicates system resource utilization and whether there are sufficient system resources available to incur additional processing and bandwidth burdens in staging a greater number of sectors into the cache 210. For instance, if a current response time or adaptor bandwidth exceeds thresholds, then the system resources, such as device adaptors and storage devices, may currently be operating at too high of a transfer rate and it would not be optimal to stage more sectors and further burden system resource utilization. However, if system utilization is low, as indicated by performance attributes such as response time and adaptor bandwidth, then more sectors may be staged in to reduce the number of sector (front and back access) misses and optimize sector hits. In this way, the retraining of the machine learning module 216 is optimized by retraining based on the current system operational conditions to ensure that increasing the number of sectors staged does not further degrade system performance.

The described embodiments provide a dynamic technique for determining the staging strategy to use to determine a number of sectors to stage into cache 210 when adding a cache to track and a dynamic technique to determine when to retrain a machine learning module used to calculate the staging strategy and sectors to stage that optimizes on one or more storage performance parameters.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
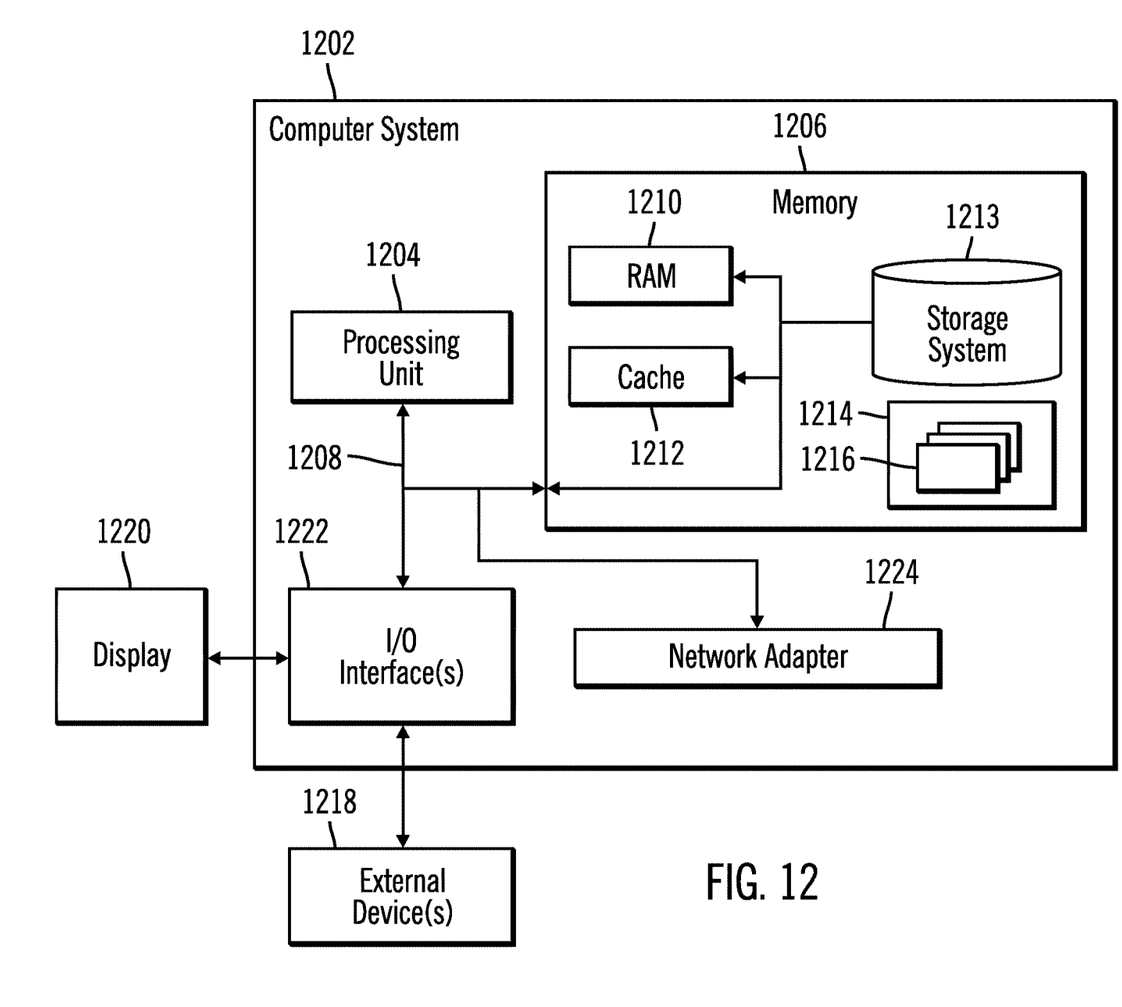
FIG. 12 illustrates a computing environment in which the components of FIG. 1 may be implemented.

The computational components of FIGS. 1 and 2, including the storage controller 100, host 108, and processing nodes $200_1$, $200_2$, $200_i$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining data to stage into cache from a storage, wherein the computer program product comprises a computer readable storage medium having computer readable program code embodied therein that when executed performs operations, the operations comprising:
   providing performance attributes related to staging tracks from the storage to the cache to a machine learning module;
   receiving, from the machine learning module having processed the performance attributes, an output indicating a staging strategy indicating an amount of data of a track to stage into the cache comprising one of a plurality of staging strategies; and
   staging the amount of data, specified by the staging strategy indicated in the output, from an accessed track that is not in the cache.

2. The computer program product of claim 1, wherein the amount of data of a track to stage as part of the plurality of staging strategies includes at least a plurality of a partial track staging to stage all sectors from a requested sector of a track, a sector staging to stage only the requested sectors of the track, and a full track staging to stage all sectors of the track.

3. The computer program product of claim 1, wherein the performance attributes provided to the machine learning module comprise a plurality of:
   cache misses indicating a number of requests to access a track that is not in the cache;
   cache hits indicating a number of requests to access a track that is in the cache;
   front accesses incremented in response to a request to a track indicated as in the cache and the request having a first requested sector of at least one sector requested that precedes a first staged sector of the track;

back accesses incremented in response to a request to a track indicated as in the cache and the request having a first requested sector of at least one sector requested that follows a last staged sector of the track;

speed of the storage including a specified speed of at least one storage device in which the storage is implemented;

a response time to respond to requests for sectors;

a current adaptor bandwidth through which data is transferred between the cache and the storage; and optimum adaptor bandwidth indicating for transferring data between the cache and the storage.

4. The computer program product of claim 1, wherein the performance attributes include:

historical front end access ratio comprising ((front accesses divided by (cache hits plus cache misses)) plus a previously calculated historical front end access ratio) divided by two; and historical alternate record access ratio comprising (((front accesses plus back accesses) divided by (cache hits plus cache misses)) plus a previously calculated historical alternate record access ratio) divided by two.

5. The computer program product of claim 1, wherein the operations further comprise:

receiving a request to access a requested track; and determining whether the requested track is in the cache, wherein the providing the performance attributes to the machine learning module is performed in response to determining the requested track is not in the cache.

6. The computer program product of claim 1, wherein the operations further comprise:

determining a predetermined number of cache misses, wherein the providing the performance attributes to the machine learning module is performed after the predetermined number of cache misses.

7. The computer program product of claim 1, wherein the performance attributes include at least a plurality of cache misses indicating a number of requests to access a track that is not in the cache, cache hits indicating a number of requests to access a track that is in the cache, front accesses incremented in response to a request to a track indicated as in the cache and the request having a first requested sector of at least one sector requested that precedes a first staged sector of the track, and back accesses incremented in response to a request to a track indicated as in the cache and the request having a first requested sector of at least one sector requested that follows a last staged sector of the track, wherein the operations further comprise:

incrementing cache hits in response to determining that the requested track is in the cache;

incrementing the cache misses in response to determining that the requested track is not in the cache;

determining whether a first of requested sectors in the requested track are in the cache in response to determining that the requested track is in the cache;

incrementing the back accesses in response to determining that the first of requested sectors follow sectors of the track in the cache; and incrementing the front accesses in response to determining that the first of requested sectors precedes sectors of the track in the cache.

8. A system for determining data to stage from a storage, comprising:

a processor;

a cache; and a computer readable storage medium having computer readable program code embodied therein that when executed performs operations, the operations comprising:

providing performance attributes related to staging tracks from the storage to the cache to a machine learning module;

receiving, from the machine learning module having processed the performance attributes, an output indicating a staging strategy indicating an amount of data of a track to stage into the cache comprising one of a plurality of staging strategies; and staging the amount of data, specified by the staging strategy indicated in the output, from an accessed track that is not in the cache.

9. The system of claim 8, wherein the amount of data of a track to stage as part of the plurality of staging strategies includes at least a plurality of a partial track staging to stage all sectors from a requested sector of a track, a sector staging to stage only the requested sectors of the track, and a full track staging to stage all sectors of the track.

10. The system of claim 8, wherein the performance attributes provided to the machine learning module comprise a plurality of:

cache misses indicating a number of requests to access a track that is not in the cache;

cache hits indicating a number of requests to access a track that is in the cache;

front accesses incremented in response to a request to a track indicated as in the cache and the request having a first requested sector of at least one sector requested that precedes a first staged sector of the track;

back accesses incremented in response to a request to a track indicated as in the cache and the request having a first requested sector of at least one sector requested that follows a last staged sector of the track;

speed of the storage including a specified speed of at least one storage device in which the storage is implemented;

a response time to respond to requests for sectors;

a current adaptor bandwidth through which data is transferred between the cache and the storage; and optimum adaptor bandwidth indicating for transferring data between the cache and the storage.

11. The system of claim 8, wherein the performance attributes include:

historical front end access ratio comprising ((front accesses divided by (cache hits plus cache misses)) plus a previously calculated historical front end access ratio) divided by two; and historical alternate record access ratio comprising (((front accesses plus back accesses) divided by (cache hits plus cache misses)) plus a previously calculated historical alternate record access ratio) divided by two.

12. The system of claim 8, wherein the operations further comprise:

receiving a request to access a requested track; and determining whether the requested track is in the cache, wherein the providing the performance attributes to the machine learning module is performed in response to determining the requested track is not in the cache.

13. The system of claim 8, wherein the operations further comprise:
- determining a predetermined number of cache misses, wherein the providing the performance attributes to the machine learning module is performed after the predetermined number of cache misses.

14. The system of claim 8, wherein the performance attributes include at least a plurality of cache misses indicating a number of requests to access a track that is not in the cache, cache hits indicating a number of requests to access a track that is in the cache, front accesses incremented in response to a request to a track indicated as in the cache and the request having a first requested sector of at least one sector requested that precedes a first staged sector of the track, and back accesses incremented in response to a request to a track indicated as in the cache and the request having a first requested sector of at least one sector requested that follows a last staged sector of the track, wherein the operations further comprise:
- incrementing cache hits in response to determining that the requested track is in the cache;
- incrementing the cache misses in response to determining that the requested track is not in the cache;
- determining whether a first of requested sectors in the requested track are in the cache in response to determining that the requested track is in the cache;
- incrementing the back accesses in response to determining that the first of requested sectors follow sectors of the track in the cache; and
- incrementing the front accesses in response to determining that the first of requested sectors precedes sectors of the track in the cache.

15. A method for determining data to stage into cache from a storage, comprising:
- providing performance attributes related to staging tracks from the storage to the cache to a machine learning module;
- receiving, from the machine learning module having processed the performance attributes, an output indicating a staging strategy indicating an amount of data of a track to stage into the cache comprising one of a plurality of staging strategies; and
- staging the amount of data, specified by the staging strategy indicated in the output, from an accessed track that is not in the cache.

16. The method of claim 15, wherein the amount of data of a track to stage as part of the plurality of staging strategies includes at least a plurality of a partial track staging to stage all sectors from a requested sector of a track, a sector staging to stage only the requested sectors of the track, and a full track staging to stage all sectors of the track.

17. The method of claim 15, wherein the performance attributes provided to the machine learning module comprise a plurality of:
- cache misses indicating a number of requests to access a track that is not in the cache;
- cache hits indicating a number of requests to access a track that is in the cache;
- front accesses incremented in response to a request to a track indicated as in the cache and the request having a first requested sector of at least one sector requested that precedes a first staged sector of the track;
- back accesses incremented in response to a request to a track indicated as in the cache and the request having a first requested sector of at least one sector requested that follows a last staged sector of the track;
- speed of the storage including a specified speed of at least one storage device in which the storage is implemented;
- a response time to respond to requests for sectors;
- a current adaptor bandwidth through which data is transferred between the cache and the storage; and
- optimum adaptor bandwidth indicating for transferring data between the cache and the storage.

18. The method of claim 15, wherein the performance attributes include:
- historical front end access ratio comprising ((front accesses divided by (cache hits plus cache misses)) plus a previously calculated historical front end access ratio) divided by two; and
- historical alternate record access ratio comprising (((front accesses plus back accesses) divided by (cache hits plus cache misses)) plus a previously calculated historical alternate record access ratio) divided by two.

19. The method of claim 15, further comprising:
receiving a request to access a requested track; and
determining whether the requested track is in the cache, wherein the providing the performance attributes to the machine learning module is performed in response to determining the requested track is not in the cache.

20. The method of claim 15, further comprising:
determining a predetermined number of cache misses, wherein the providing the performance attributes to the machine learning module is performed after the predetermined number of cache misses.

* * * * *